US011283389B2

(12) United States Patent
Kimura et al.

(10) Patent No.: US 11,283,389 B2
(45) Date of Patent: Mar. 22, 2022

(54) MOTOR SYSTEM

(71) Applicant: HITACHI AUTOMOTIVE SYSTEMS, LTD., Hitachinaka (JP)

(72) Inventors: Makoto Kimura, Yokohama (JP); Masaki Itabashi, Hanno (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 381 days.

(21) Appl. No.: 16/490,741

(22) PCT Filed: Jan. 25, 2018

(86) PCT No.: PCT/JP2018/002234
§ 371 (c)(1),
(2) Date: Sep. 3, 2019

(87) PCT Pub. No.: WO2018/173469
PCT Pub. Date: Sep. 27, 2018

(65) Prior Publication Data
US 2020/0021233 A1    Jan. 16, 2020

(30) Foreign Application Priority Data

Mar. 23, 2017 (JP) .............................. JP2017-057049

(51) Int. Cl.
*H02P 29/024* (2016.01)
*H02P 6/12* (2006.01)
(Continued)

(52) U.S. Cl.
CPC ........ *H02P 29/0241* (2016.02); *B62D 5/0484* (2013.01); *H02K 1/145* (2013.01);
(Continued)

(58) Field of Classification Search
CPC ........ H02P 29/0241; H02P 6/12; H02P 27/06; H02K 1/145; H02K 7/006; B62D 5/0484; H02M 7/48
See application file for complete search history.

(56) References Cited

U.S. PATENT DOCUMENTS 8,499,885 B1 * 8/2013 Satou ................... B62D 5/0484
180/446
9,806,643 B2 * 10/2017 Oyama ..................... H02P 3/06
(Continued)

FOREIGN PATENT DOCUMENTS

JP    2013-183462    9/2013
JP    2013-215040    10/2013
(Continued)

*Primary Examiner* — Kawing Chan
(74) *Attorney, Agent, or Firm* — Foley & Lardner LLP

(57) ABSTRACT

A motor system includes first and second solid-state relays disposed between an inverter configured to control energization to a first coil set of a motor and an in-vehicle battery for supplying power to the inverter, and connected in series in this order in a direction from the inverter to the battery. The first solid-state relay has a first diode of which a forward direction is from the battery to the inverter. The second solid-state relay has a second diode of which a forward direction is from the inverter to the battery. Motor relays, each having a third diode of which a forward direction is from the neutral point to the inverter, are connected to the phase coils of the first coil set. When power supply from the battery to the inverter is interrupted, the first solid-state relay is turned off after the motor relays are turned off.

11 Claims, 8 Drawing Sheets

(51) Int. Cl.
  *H02K 7/00* (2006.01)
  *H02M 7/48* (2007.01)
  *H02P 27/06* (2006.01)
  *B62D 5/04* (2006.01)
  *H02K 1/14* (2006.01)

(52) U.S. Cl.
  CPC .............. *H02K 7/006* (2013.01); *H02M 7/48* (2013.01); *H02P 6/12* (2013.01); *H02P 27/06* (2013.01)

(56) References Cited

U.S. PATENT DOCUMENTS

| | | | | |
|---|---|---|---|---|
| 10,381,959 | B2* | 8/2019 | Yamane | H02P 6/06 |
| 11,081,997 | B2* | 8/2021 | Ohashi | B62D 5/0463 |
| 2011/0285335 | A1* | 11/2011 | Tada | H02M 1/32 |
| | | | | 318/400.22 |
| 2014/0055059 | A1* | 2/2014 | Uryu | B62D 5/0484 |
| | | | | 318/9 |
| 2014/0055887 | A1* | 2/2014 | Uryu | B62D 5/0484 |
| | | | | 361/18 |
| 2016/0134212 | A1* | 5/2016 | Kikuchi | H02P 6/085 |
| | | | | 318/400.21 |
| 2016/0173020 | A1* | 6/2016 | Kanekawa | B62D 5/0484 |
| | | | | 318/400.06 |
| 2016/0181953 | A1* | 6/2016 | Oyama | G05B 15/02 |
| | | | | 180/446 |
| 2017/0237377 | A1* | 8/2017 | Furukawa | H02P 29/00 |
| | | | | 318/564 |
| 2019/0077449 | A1* | 3/2019 | Wada | H02K 3/28 |
| 2019/0210640 | A1* | 7/2019 | Ohashi | B62D 6/00 |
| 2019/0267926 | A1* | 8/2019 | Tsubaki | B62D 5/04 |
| 2019/0372501 | A1* | 12/2019 | Wada | H02M 7/5387 |
| 2020/0021233 | A1* | 1/2020 | Kimura | H02K 7/006 |
| 2020/0055542 | A1* | 2/2020 | Yamamoto | B62D 5/0481 |

FOREIGN PATENT DOCUMENTS

| | | |
|---|---|---|
| JP | 2014-045576 | 3/2014 |
| WO | WO-2014/136166 | 9/2014 |
| WO | WO-2015/019652 | 2/2015 |

\* cited by examiner

MOTOR SYSTEM

TECHNICAL FIELD

The present invention relates to a motor system including a motor having a plurality of stator coils and a controller configured to control the energization to the stator coils.

BACKGROUND ART

Known examples of conventional motor systems include motor systems for an electric power steering apparatus that uses the motor to generate a steering assist force, as disclosed in Patent Document 1. Such a motor system includes two power supply relays, each formed of a semiconductor switching element, provided and connected in series between the in-vehicle battery and the inverter. Among these two power supply relays, the power supply relay closer to the inverter is disposed with the forward direction of its parasitic diode oriented from the in-vehicle battery to the inverter. The other power supply relay, closer to the in-vehicle battery, is disposed with the forward direction of its parasitic diode oriented from the inverter to the in-vehicle battery.

In the motor system disclosed in Patent Document 1, when an abnormality has occurred and the power supply to the plurality of stator coils of the motor is interrupted as fail-safe processing for addressing the abnormality, a back electromotive force may be generated in the motor by the rotation of the rotor caused by an external force. In order to recover a current caused by the back electromotive force to regeneratively charge the in-vehicle battery, the power supply relay closer to the in-vehicle battery is turned off while the power supply relay closer to the inverter is turned on in the motor system.

REFERENCE DOCUMENT LIST

Patent Document

Patent Document 1: JP 2013-215040 A

SUMMARY OF THE INVENTION

Problem to be Solved by the Invention

However, turning off the power supply relay closer to the in-vehicle battery while turning on the power supply relay closer to the inverter will cause a closed circuit to form between the motor and the in-vehicle battery. Thus, when a back electromotive force is generated in the motor by the rotation of the rotor caused by an external force, the current caused by the back electromotive force continuously flows through the parasitic diodes of the semiconductor switching elements in the power supply relay closer to the in-vehicle battery and in the inverter. As a result, the current caused by the back electromotive force may affect the durability of the semiconductor switching elements of the power supply relay and/or the inverter.

In view of the above problems, the present invention has been made to provide a motor system having improved durability and allowing regenerative recovery of a back electromotive force generated in a motor by the rotation of a rotor caused by an external force.

Means for Solving the Problem

According to an aspect of the present invention, a motor system includes a first solid-state relay and a second solid-state relay that are disposed between an inverter configured to control the energization to a plurality of stator coils of a motor and a battery for supplying power to the inverter, and connected in series in this order in a direction from the inverter to the battery. The first solid-state relay has a first diode of which a forward direction is from the battery to the inverter. The second solid-state relay has a second diode of which a forward direction is from the inverter to the battery. When power supply from the battery to the inverter is interrupted, the first solid-state relay is turned off after the motor relays provided one-to-one for the plurality of stator coils are turned off.

Effects of the Invention

The motor system according to the present invention has an improved durability and allows regenerative recovery of a back electromotive force generated in the motor by the rotation of the rotor caused by an external force.

MODES FOR CARRYING OUT THE INVENTION

An embodiment of the present invention will be described in detail below with reference to the accompanying drawings.

First Embodiment

Figure 1:
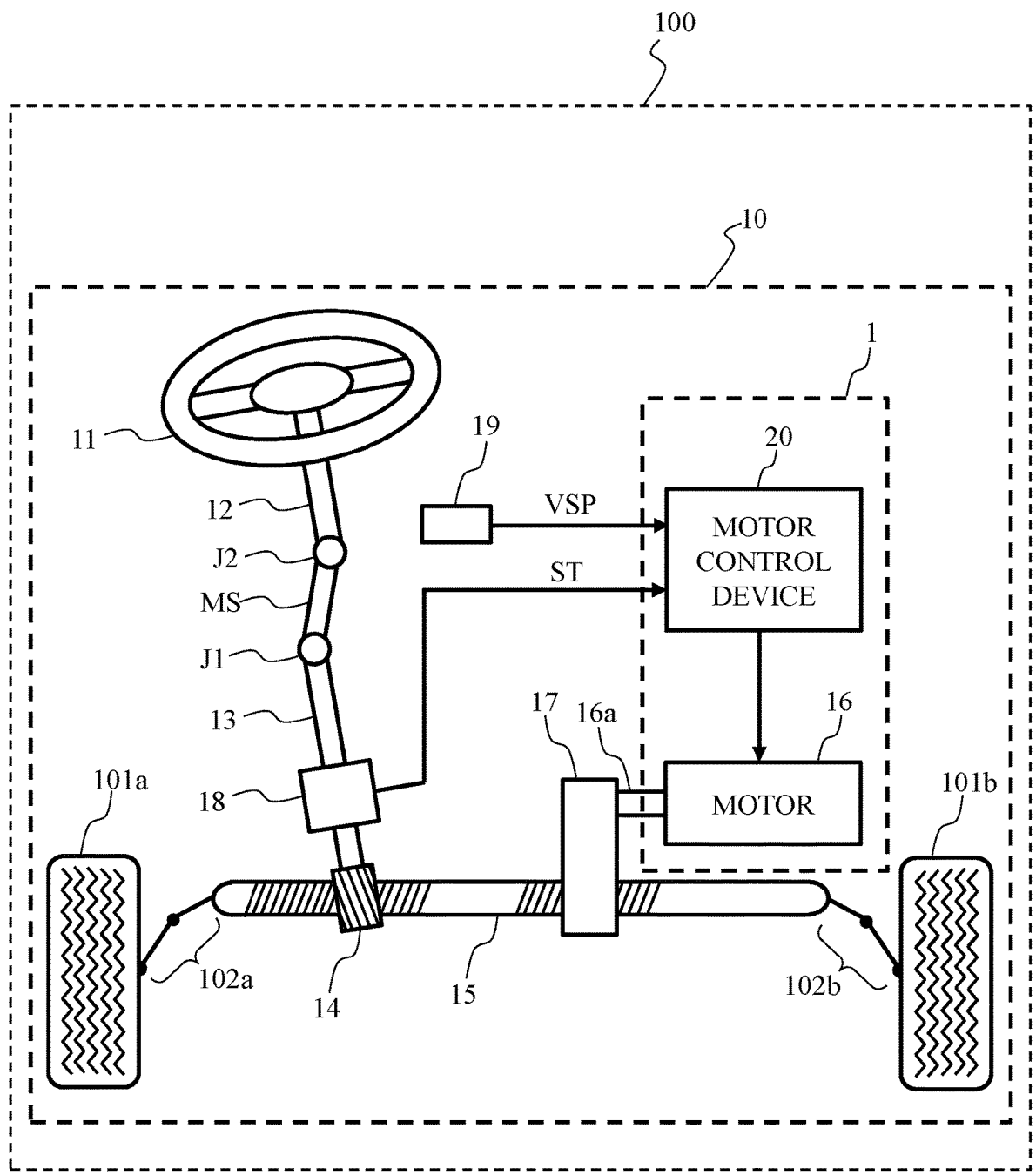
FIG. 1 is a schematic view of an electric power steering apparatus that uses a motor system according to a first embodiment of the present invention.

FIG. 1 illustrates an example of an electric power steering apparatus that uses a motor system according to a first embodiment of the present invention.

Electric Power Steering Apparatus

An electric power steering apparatus 10 of a vehicle 100 includes a steering wheel 11, a steering shaft 12, a pinion shaft 13, a pinion gear 14, and a rack gear 15. The steering force caused by steering operation of the driver is input to steering wheel 11, which is connected to steering shaft 12. Pinion shaft 13 is connected at one end to steering wheel 11 via a first universal joint J1, a middle shaft MS, a second universal joint J2, and steering shaft 12. Pinion gear 14 is connected to the other end of pinion shaft 13. Rack gear 15 meshes with pinion gear 14 and converts the rotational movement of pinion gear 14 into linear movement.

In addition, electric power steering apparatus 10 also includes a motor 16, a reduction drive 17, a steering torque sensor 18, a vehicle speed sensor 19, and a motor control device 20. Motor 16 is used as a source of steering assist force. Reduction drive 17 is connected to a rotation shaft 16*a* of motor 16 and transmits, to rack gear 15, a rotation speed reduced from the rotation speed of rotation shaft 16*a*. Steering torque sensor 18 detects a steering torque based on the twist angle of pinion shaft 13 (or steering shaft 12). Vehicle speed sensor 19 detects the speed of vehicle 100. Motor control device 20 is electrically connected to steering torque sensor 18 and vehicle speed sensor 19 and controls the rotational drive of motor 16. Motor 16 and motor control device 20 constitute a motor system 1.

When steering wheel 11 is operated, the rotational force of steering wheel 11 is transmitted to rack gear 15 through steering shaft 12, second universal joint J2, middle shaft MS, first universal joint J1, pinion shaft 13, and pinion gear 14. As a result, rack gear 15 linearly moves in the width direction of vehicle 100. The opposite ends of rack gear 15 are connected to a pair of steering mechanisms 102*a*, 102*b* for respectively steering a pair of steered wheels 101*a*, 101*b*. When rack gear 15 linearly moves in the vehicle width direction, the angle of the pair of steered wheels 101*a*, 101*b* is changed. At the same time, motor control device 20 receives an output signal ST from steering torque sensor 18 and an output signal VSP from vehicle speed sensor 19, and rotationally drives motor 16 based on the output signal ST and the output signal VSP so as to generate a steering assist force in accordance with the driving conditions of vehicle 100.

Motor System

Figure 2:
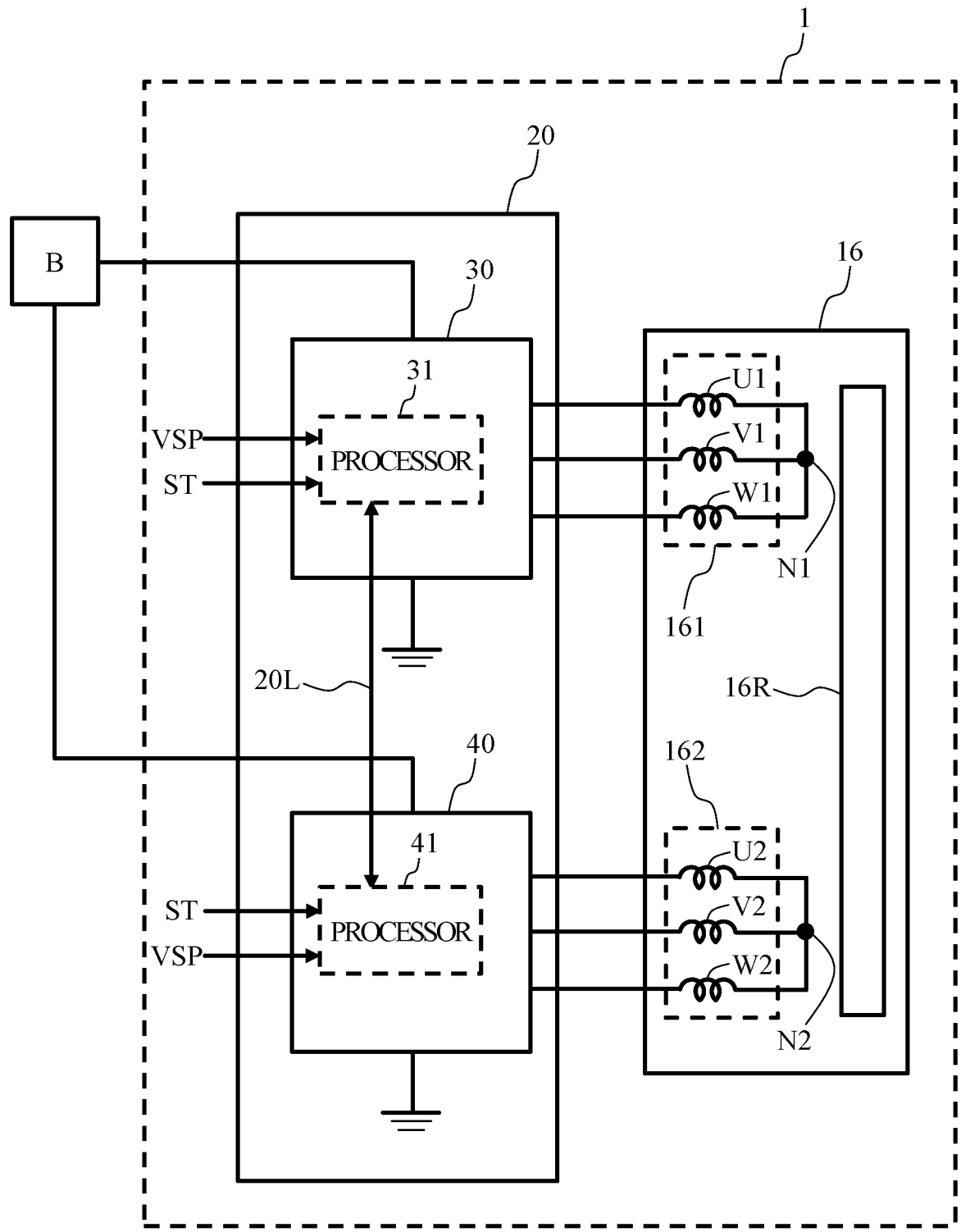
FIG. 2 is a schematic view of the motor system.

FIG. 2 illustrates an example of an internal configuration of motor system 1. Motor 16, which is a three-phase brushless motor, has a stator (not illustrated in the drawings) and a rotor 16R. The stator includes two mutually independent coil sets: a first coil set (plurality of stator coils) 161 formed of three-phase coils, i.e., a U-phase coil U1, a V-phase coil V1, and a W-phase coil W1; and a second coil set 162 formed of three-phase coils, i.e., a U-phase coil U2, a V-phase coil V2, and a W-phase coil W2. Rotor 16R, which is a permanent magnet rotor, is rotatably disposed in a center portion of the stator. First and second coil sets 161, 162 are wound around the stator so as to be insulated from each other and share a magnetic circuit.

One ends of U-phase coil U1, V-phase coil V1, and W-phase coil W1 in first coil set 161 are electrically connected to each other at a neutral point N1 such that U-phase coil U1, V-phase coil V1, and W-phase coil W1 are Y-connected. One ends of U-phase coil U2, V-phase coil V2, and W-phase coil W2 in second coil set 162 are electrically connected to each other at a neutral point N2 such that U-phase coil U2, V-phase coil V2, and W-phase coil W2 are Y-connected.

Motor control device 20 includes a first controller 30 and a second controller 40. First controller 30 receives power supply from an in-vehicle battery B and controls the energization to first coil set 161 of motor 16. Second controller 40 receives power supply from in-vehicle battery B and controls the energization to second coil set 162.

First controller 30 includes a processor 31 and second controller 40 includes a processor 41. Processors 31, 41 receive the output signal ST from steering torque sensor 18 and the output signal VSP from vehicle speed sensor 19. From the current steering torque and vehicle speed, each processor 31, 41 calculates a required steering assist force (target steering assist force). Then, processors 31, 41 control the energization to coil sets 161, 162 such that motor 16 generates a rotational driving force corresponding to the target steering assist force.

More specifically, the ratio of the energization amount from first controller 30 to first coil set 161 to the energization amount from second controller 40 to second coil set 162, which is also referred to as an energization ratio, is previously set to 50%:50%. Processors 31, 41 control the energization to coil sets 161, 162 such that the total energization amount from first and second controllers 30, 40 causes motor 16 to generate a rotational driving force corresponding to the target steering assist force.

In addition, processor 31 of first controller 30 has an abnormality diagnostic function of diagnosing whether or not an abnormality (failure) has occurred in a first energization system including first controller 30 and first coil set 161. Similarly, processor 41 of second controller 40 has an abnormality diagnostic function of diagnosing whether or not an abnormality has occurred in a second energization system including second controller 40 and second coil set 162.

Processor 31 of first controller 30 and processor 41 of second controller 40 are directly communicably connected to each other through a communication line 20L. When either processor of first and second controllers 30, 40 diagnoses that an abnormality has occurred in the corresponding energization system by using the abnormality diagnostic function, this processor performs the following operations. Specifically, the processor that has diagnosed the occurrence of an abnormality performs control for stopping energization to the corresponding coil set, and transmits, to the other processor in a normally operating energization system, an abnormality signal that indicates the occurrence of an abnormality through communication line 20L. Upon receiving the abnormality signal, the other processor in the normally operating energization system forces its energization ratio to a predetermined value in a range of 50% to 100% so that motor 16 generates a rotational driving force corresponding to a steering assist force required to help the driver perform steering operations, and controls the energization to the corresponding coil set based on this energization ratio. As described above, motor system 1 is designed to be redundant by having two energization systems for motor 16; that is, the first and second energization systems. Since the first and second energization systems have the same configuration, the first energization system including first controller 30 and first coil set 161 of motor 16 in motor system 1 will be described in detail below.

First Energization System

Figure 3:
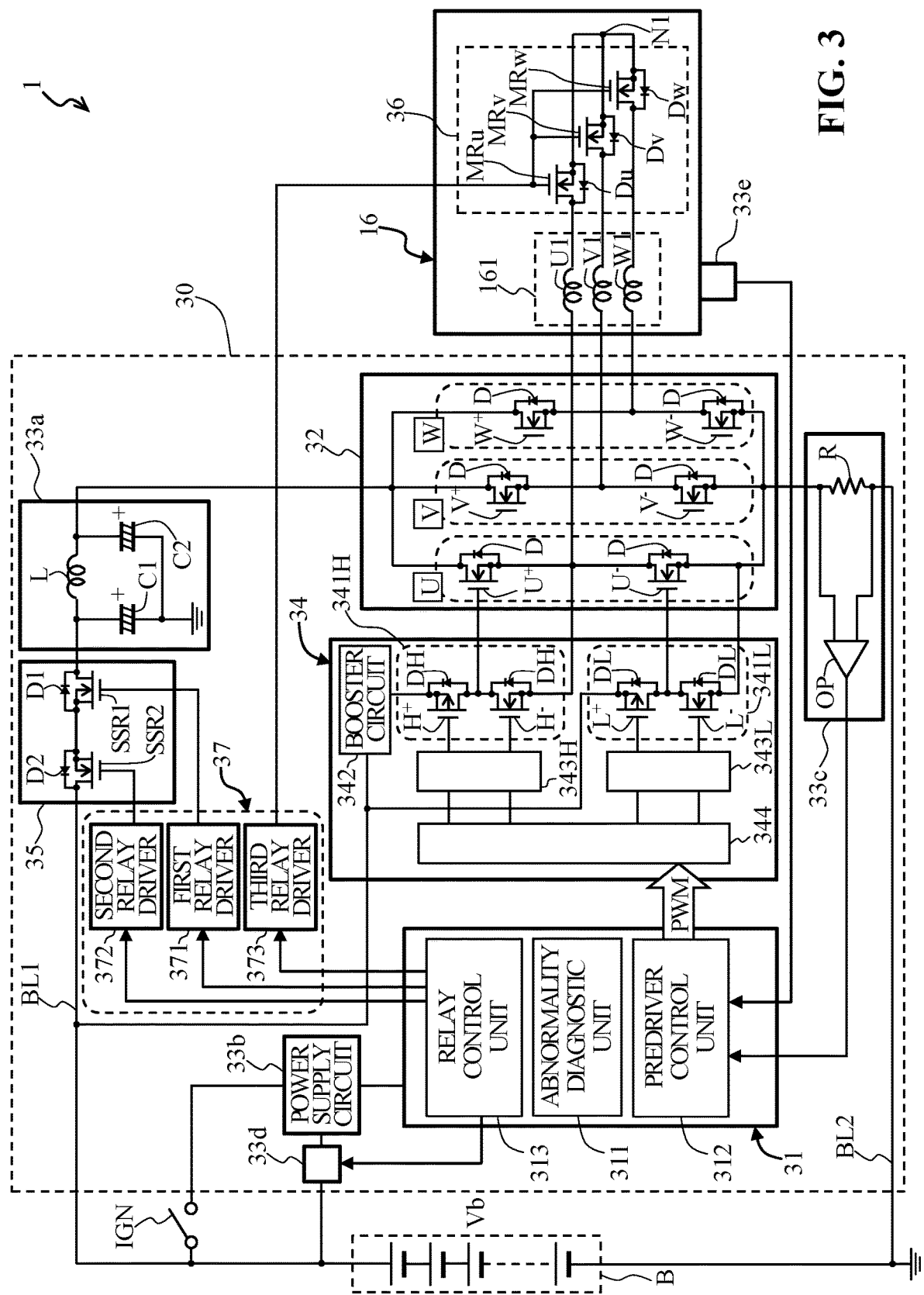
FIG. 3 is a circuit diagram of a first energization system in the motor system.

FIG. 3 is a circuit diagram illustrating an example of a configuration of the first energization system in motor system 1. The first energization system includes first controller 30 and first coil set 161 as described above. First controller 30 includes an inverter 32 configured to control the energization to first coil set 161 of motor 16. Inverter 32 is connected to the positive electrode of in-vehicle battery B through a positive feed line BL1 to receive power supply. In addition, inverter 32 is connected to the negative electrode of in-vehicle battery B and grounded through a negative feed line BL2.

On positive feed line BL1 for first controller 30, a smoothing circuit 33*a* is disposed. Smoothing circuit 33*a* is formed of: a coil L connected between inverter 32 and in-vehicle battery B; and two grounded capacitors C1, C2 connected to the opposite ends of coil L. Thus, inverter 32 is supplied with power after smoothing circuit 33*a* reduces a ripple voltage from the power supply voltage Vb of in-vehicle battery B. In addition, a power supply circuit 33*b* is also connected to positive feed line BL1 for first controller 30 via an ignition switch IGN. Power supply circuit 33*b* is configured to receive the power supply voltage Vb of in-vehicle battery B and output a voltage necessary for the components of first controller 30.

On negative feed line BL2 for first controller 30, a current sensing circuit 33c is disposed. Current sensing circuit 33c is formed of: a shunt resistor R connected between inverter 32 and the ground; and an amplifier OP having two input terminals connected to the opposite ends of shunt resistor R. Current sensing circuit 33c detects the current supplied from in-vehicle battery B to first coil set 161 of motor 16. Amplifier OP outputs, from its output terminal, a voltage corresponding to the potential difference between the opposite ends of shunt resistor R as a detected current value.

Inverter 32 has a three-phase bridge circuit including a U-phase arm, a V-phase arm, and a W-phase arm that are connected in parallel with each other between positive feed line BL1 and negative feed line BL2 extending from in-vehicle battery B. The U-phase arm is formed of an upper-arm switching element $U^+$ and a lower-arm switching element $U^-$ that are connected in series with each other. The V-phase arm is formed of an upper-arm switching element $V^+$ and a lower-arm switching element $V^-$ that are connected in series with each other. The W-phase arm is formed of an upper-arm switching element $W^+$ and a lower-arm switching element $W^-$ that are connected in series with each other.

Thus, in inverter 32, the end, opposite to the one end connected to neutral point N1, of U-phase coil U1 is connected to a point between switching elements $U^+$ and $U^-$ of the U-phase arm. Similarly, the end, opposite to the one end connected to neutral point N1, of V-phase coil V1 is connected to a point between switching elements $V^+$ and $V^-$ of the V-phase arm. The end, opposite to the one end connected to neutral point N1, of W-phase coil W1 is connected to a point between switching elements $W^+$ and $W^-$ of the W-phase arm.

Each switching element $U^+$, $U^-$, $V^+$, $V^-$, $W^+$, $W^-$ in inverter 32 is a semiconductor element configured to be turned on and off by a control signal input to the control terminal of the switching element. To each switching element $U^+$, $U^-$, $V^+$, $V^-$, $W^+$, $W^-$ in inverter 32, a freewheeling diode D is connected in antiparallel for recovering a back electromotive voltage generated in motor 16 to regeneratively charge in-vehicle battery B. Here, N-channel metal-oxide-semiconductor field-effect transistors (MOSFETs), each having a gate electrode to which a control signal is input, may be used as switching elements $U^+$, $U^-$, $V^+$, $V^-$, $W^+$, $W^-$, for example. In this case, the back electromotive voltage generated in motor 16 is recovered by freewheeling diodes D served by parasitic diodes that are inevitably formed between the drain and source of the MOSFETs in the manufacturing process, so as to regeneratively charge in-vehicle battery B through positive feed line BL1.

As used herein, the "on" state of each switching element $U^+$, $U^-$, $V^+$, $V^-$, $W^+$, $W^-$ in inverter 32 refers to an energized state in which a current flows through the switching element. On the other hand, the "off" state of each switching element $U^+$, $U^-$, $V^+$, $V^-$, $W^+$, $W^-$ in inverter 32 refers to a current interruption state in which a current flow through the switching element is interrupted. The same applies to other switching elements such as those used as solid-state relays and motor relays, which will be described later.

First controller 30 has a predriver 34 configured to control the drive of inverter 32. Predriver 34 has upper-arm push-pull circuits configured to individually turn on and off upper-arm switching elements $U^+$, $V^+$, $W^+$ in inverter 32. Also, predriver 34 has lower-arm push-pull circuits configured to individually turn on and off lower-arm switching elements $U^-$, $V^-$, $W^-$ in inverter 32. The output of each push-pull circuit is input to the gate electrode of the corresponding switching element. As a representative example, a configuration of predriver 34 for turning on and off switching elements $U^+$, $U^-$ in the U-phase arm will be described below. Thus, FIG. 3 illustrates an upper-arm push-pull circuit 341H configured to turn on and off upper-arm switching element $U^+$, and a lower-arm push-pull circuit 341L configured to turn on and off lower-arm switching element $U^-$.

Upper-arm push-pull circuit 341H has a high-side switching element $H^+$ and a low-side switching element $H^-$ connected in series with each other. Lower-arm push-pull circuit 341L has a high-side switching element $L^+$ and a low-side switching element $L^-$ connected in series with each other. In this embodiment, P-channel MOSFETs are used as high-side switching elements $H^+$, $L^+$, and N-channel MOSFETs are used as low-side switching elements $H^-$, $L^-$. In upper-arm push-pull circuit 341H, the drain electrode of high-side switching element $H^+$, the drain electrode of low-side switching element $H^-$, and the gate electrode of upper-arm switching element $U^+$ in inverter 32 are connected with each other. In lower-arm push-pull circuit 341L, the drain electrode of high-side switching element $L^+$, the drain electrode of low-side switching element $L^-$, and the gate electrode of lower-arm switching element $U^-$ are connected with each other.

Predriver 34 includes a booster circuit 342 connected to positive feed line BL1 and configured to boost the power supply voltage Vb of in-vehicle battery B to generate a boosted voltage higher than the power supply voltage Vb of in-vehicle battery B. Booster circuit 342 is a charge pump circuit formed of a capacitor, a diode, and a switch, for example. In upper-arm push-pull circuit 341H, the source electrode of high-side switching element $H^+$ is connected to booster circuit 342, so that a boosted voltage is used as the source voltage of high-side switching element $H^+$. The source electrode of low-side switching element $H^-$ of upper-arm push-pull circuit 341H is connected to a point between switching elements $U^+$ and $U^-$ of the U-phase arm. On the other hand, in lower-arm push-pull circuit 341L, the source electrode of high-side switching element $L^+$ is connected not to booster circuit 342 but to in-vehicle battery B, so that the power supply voltage Vb of in-vehicle battery B is used as the source voltage of high-side switching element $L^+$. The source electrode of low-side switching element $L^-$ of lower-arm push-pull circuit 341L is connected to the source electrode of lower-arm switching element $U^-$ of the U-phase arm.

The source electrode of high-side switching element $H^+$ of upper-arm push-pull circuit 341H is connected to the booster circuit 342 for the following reason. Assume that the control signal output from upper-arm push-pull circuit 341H to the gate electrode of upper-arm switching element $U^+$ in inverter 32 has a voltage equal to or below the power supply voltage Vb of in-vehicle battery B. In this case, depending on the driving conditions of motor 16, the source voltage of upper-arm switching element $U^+$ may increase, and the gate-source voltage of upper-arm switching element $U^+$ sometimes does not exceed a threshold voltage of upper-arm switching element $U^+$.

In predriver 34, the gate terminals of high-side switching element $H^+$ and low-side switching element $H^-$ of upper-arm push-pull circuit 341H are both connected to a driver circuit 343H. Similarly, the gate terminals of high-side switching element $L^+$ and low-side switching element $L^-$ of lower-arm push-pull circuit 341L are both connected to a driver circuit 343L. Furthermore, in predriver 34, driver circuits 343H, 343L are connected to a logic circuit 344, and logic circuit 344 generates a drive signal for controlling driver circuits 343H, 343L based on motor control signals output from processor 31.

In accordance with the drive signal output from logic circuit 344, driver circuit 343H turns on either high-side switching element H$^+$ or low-side switching element H$^-$ of upper-arm push-pull circuit 341H. As a result, either the boosted voltage or the source voltage of upper-arm switching element U$^+$ is output from upper-arm push-pull circuit 341H to the gate electrode of upper-arm switching element U$^+$, thereby providing on/off control of upper-arm switching element U$^+$.

Similarly, in accordance with the drive signal output from logic circuit 344, driver circuit 343L turns on either high-side switching element L$^+$ or low-side switching element L$^-$ of lower-arm push-pull circuit 341L. As a result, either the power supply voltage Vb of in-vehicle battery B or the ground voltage is output from lower-arm push-pull circuit 341L to the gate electrode of lower-arm switching element U$^-$, thereby providing on/off control of lower-arm switching element U$^-$.

First controller 30 has a power supply relay 35, motor relays 36, and a self cutout relay 33$d$. Power supply relay 35 is disposed on positive feed line BL1 at a location between in-vehicle battery B and inverter 32, and has a first solid-state relay (referred to as "SSR1" below) and a second solid-state relay (referred to as "SSR2" below). SSR1 is configured to interrupt a short circuit current generated when in-vehicle battery B is reversely connected, that is, when in-vehicle battery B is accidentally connected with reverse polarity. SSR2 is configured to stop energization to first coil set 161 when an abnormality has occurred in the first energization system. SSR1 and SSR2 are disposed and connected in series in this order in the direction from inverter 32 to in-vehicle battery B.

SSR1 and SSR2 are noncontact relays each having no moving contact and formed of a semiconductor switching element such as a thyristor, a triac, a diode, or a transistor. In particular, N-channel MOSFETs may be used as SSR1 and SSR2. In this case, the source electrode of SSR1 is connected to the source electrode of SSR2, the drain electrode of SSR1 is connected to inverter 32 via smoothing circuit 33$a$, and the drain electrode of SSR2 is connected to the positive electrode of in-vehicle battery B. A parasitic diode D1 of SSR1 serves as a first diode of which a forward direction is from the positive electrode of in-vehicle battery B to inverter 32, and a parasitic diode D2 of SSR2 serves as a second diode of which a forward direction is from inverter 32 to the positive electrode of in-vehicle battery B.

When first controller 30 energizes first coil set 161, SSR1 and SSR2 are turned on. On the other hand, when the first energization system has failed and the energization to first coil set 161 is stopped, SSR2 is turned off but SSR1 is maintained on. This aims to recover a back electromotive voltage generated in motor 16 via the channel portion of SSR1 and parasitic diode D2 of SSR2 to regeneratively charge in-vehicle battery B. Even when first controller 30 does not energize first coil set 161, a back electromotive voltage is generated in motor 16 by an external rotational force applied to motor 16 and/or the energization from second controller 40 to second coil set 162 (see FIG. 2).

Also, if it is assumed that power supply relay 35 is formed of SSR2 alone, reverse connection of in-vehicle battery B, if any, will cause a closed circuit through in-vehicle battery B, the ground, freewheeling diodes D of switching elements U$^+$, U$^-$, V$^+$, V$^-$, W$^+$, W$^-$ in inverter 32, and parasitic diode D2 of SSR2, and a short circuit current will flow therethrough. Actually, however, by additionally including SSR1 between SSR2 and inverter 32, power supply relay 35 is capable of interrupting a short circuit current due to reverse connection of in-vehicle battery B.

Motor relays 36 are configured to interrupt the energization to the respective phase coils of motor 16, and provided between first coil set 161 and neutral point N1. Motor relays 36 include three relays to motor 16, which are a U-phase motor relay MRu, a V-phase motor relay MRv, and a W-phase motor relay MRw. U-phase motor relay MRu is provided between neutral point N1 and U-phase coil U1. V-phase motor relay MRv is provided between neutral point N1 and V-phase coil V1. W-phase motor relay MRw is provided between neutral point N1 and W-phase coil W1.

Similar to SSR1 and SSR2, motor relays 36 are noncontact relays each having no moving contact and formed of a semiconductor switching element. In particular, N-channel MOSFETs may be used as motor relays 36. In this case, the source electrodes of motor relays 36 are connected to each other at neutral point N1. Accordingly, each of a parasitic diode Du of U-phase motor relay MRu, a parasitic diode Dv of V-phase motor relay MRv, and a parasitic diode Dw of W-phase motor relay MRw is disposed with its anode located closer to neutral point N1 and serves as a third diode of which a forward direction is from neutral point N1 to the corresponding phase coil.

Self cutout relay 33$d$ is connected between positive feed line BL1 and power supply circuit 33$b$ in parallel with ignition switch IGN, and configured to be turned on and off in accordance with a control signal from processor 31. When self cutout relay 33$d$ is turned on, the power supply voltage Vb from in-vehicle battery B is input to power supply circuit 33$b$. When self cutout relay 33$d$ is turned off, the power supply voltage Vb from in-vehicle battery B is interrupted.

Logic circuit 344 in predriver 34 described above is connected to processor 31 which is an arithmetic processing unit such as a central processing unit (CPU) or a micro-processing unit (MPU). Processor 31 is powered by the output voltage from power supply circuit 33$b$. Processor 31 includes an abnormality diagnostic unit 311, a predriver control unit 312, and a relay control unit 313. Abnormality diagnostic unit 311 is configured to execute the abnormality diagnostic function described above.

Predriver control unit 312 generates the motor control signals to be output to logic circuit 344 of predriver 34. The motor control signals are generated based on various signals so as to generate a rotational drive force (drive current) corresponding to the target steering assist force calculated as described above in processor 31. The various signals include an output signal from amplifier OP of current sensing circuit 33$c$ and an output signal from a magnetic pole position sensor 33$e$ configured to detect the magnetic pole position of rotor 16R (see FIG. 2) in motor 16. In FIG. 3, as an example, the motor control signals are illustrated as pulse width modulation (PWM) signals, each of which has a modulated pulse width. With the PWM signals, the duties that define the on/off time ratios of switching elements U$^+$, U$^-$, V$^+$, V$^-$, W$^+$, W$^-$ are altered so as to change the phase currents of motor 16.

Relay control unit 313 controls power supply relay 35, motor relays 36, and self cutout relay 33$d$. More specifically, via a relay driver 37, relay control unit 313 outputs control signals to the control terminals of the switching elements of power supply relay 35 and motor relays 36. Relay driver 37 has a first relay driver 371 configured to drive SSR1 of power supply relay 35, a second relay driver 372 configured to drive SSR2 of power supply relay 35, and a third relay driver 373 configured to drive motor relays 36.

Relay control unit 313 is also configured to detect that ignition switch IGN is turned off. Accordingly, when relay control unit 313 detects that the ignition switch IGN is turned off, relay control unit 313 maintains the on state of self cutout relay 33d so as to maintain the power supply from power supply circuit 33b to processor 31 and the like. Then, after a predetermined time Toff has elapsed since relay control unit 313 detects that the ignition switch IGN is turned off, relay control unit 313 turns off self cutout relay 33d.

Relay Control Processing

Figure 4:
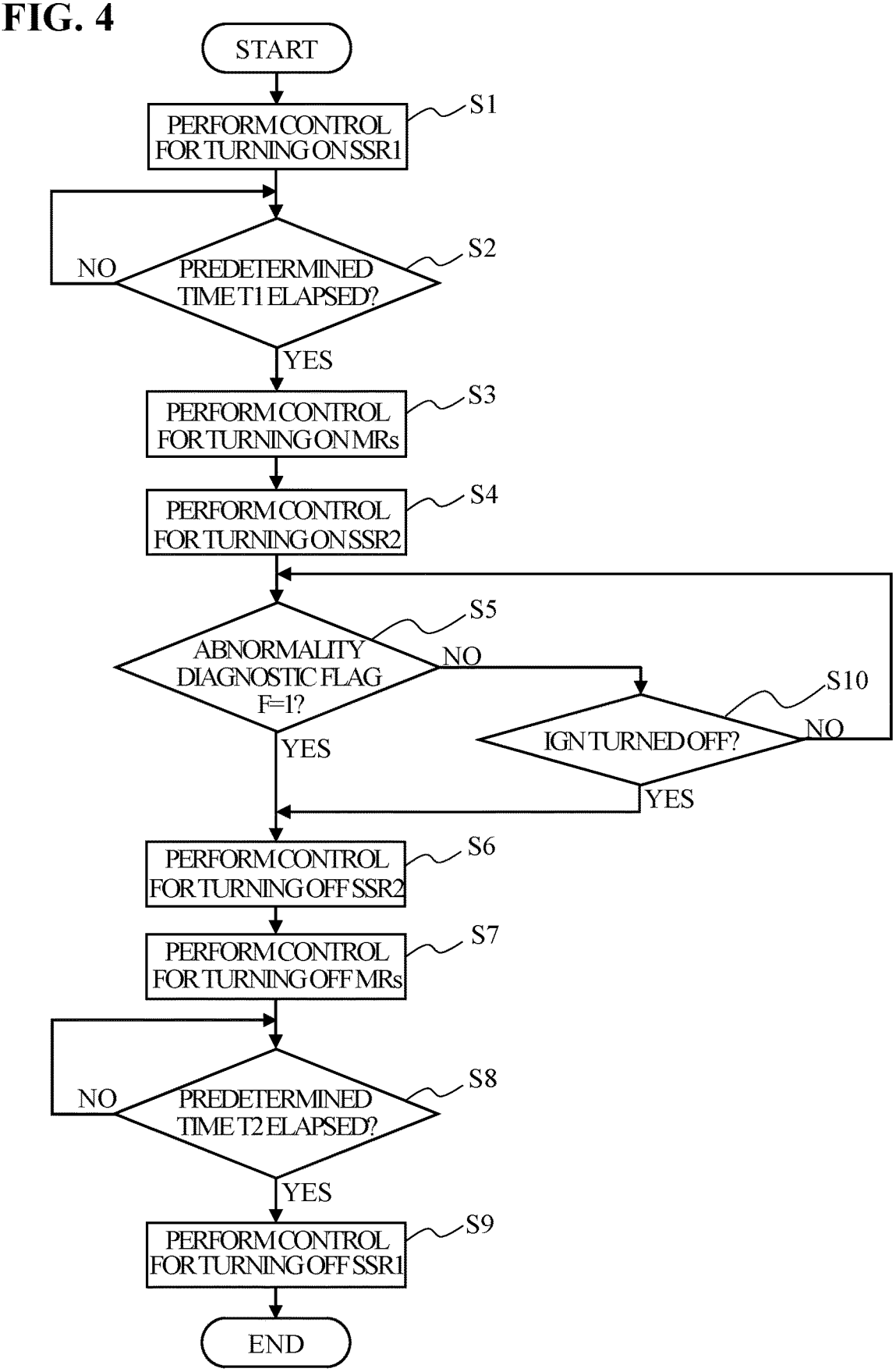
FIG. 4 is a flowchart illustrating relay control processing performed in the motor system.

FIG. 4 illustrates an example of relay control processing executed by processor 31 in response to the start of power supply from power supply circuit 33b to processor 31 caused by the turning on of ignition switch IGN. In the exemplary timing chart of FIG. 5, ignition switch IGN is turned on at time t0. Hereinafter, the relay control processing illustrated in FIG. 4 will be described with reference to the timing chart of FIG. 5.

Figure 5:
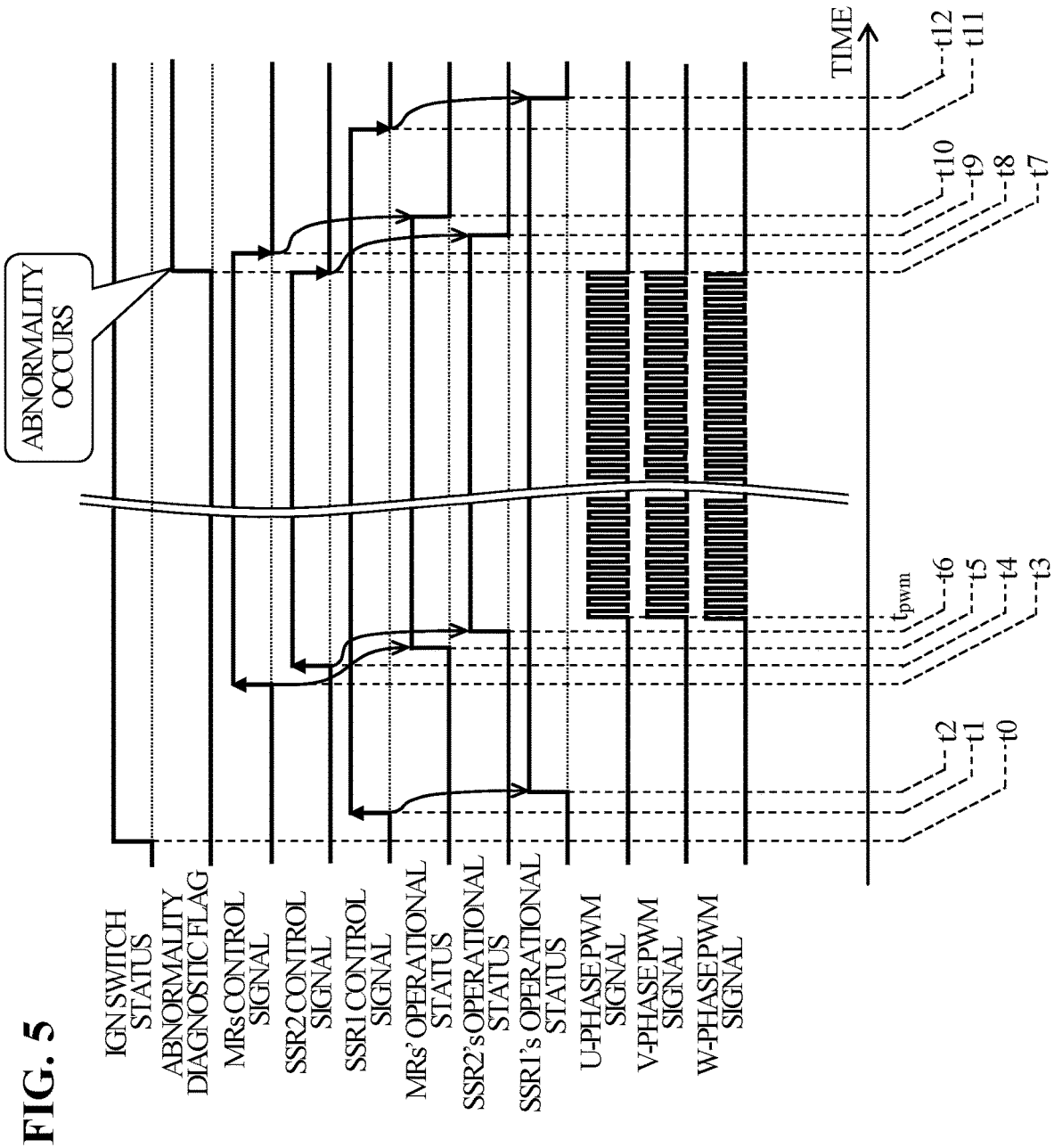
FIG. 5 is a timing chart for illustrating the relay control processing performed in the motor system.

In step S1 (abbreviated as "S1" in FIG. 4; the same applies to the other steps below), relay control unit 313 outputs a control signal for turning on SSR1 to first relay driver 371 (performs control for turning on SSR1) at time t1 in FIG. 5. As a result, SSR1 is turned on at time t2 with a turn-on delay and/or the like.

The reason why SSR1 is turned on before SSR2 and motor relays 36 are turned on, in response to the turning on of ignition switch IGN, will be described below. When rotor 16R is rotated by an external force before motor 16 is energized via inverter 32, a back electromotive voltage is generated in motor 16. If SSR1 is not turned on, such a back electromotive voltage is not recovered via the channel portion of SSR1 to generatively charge in-vehicle battery B. In this case, the back electromotive voltage generated in motor 16 may damage predriver 34, such as damaging booster circuit 342 via parasitic diode DH of high-side switching element H$^+$ in predriver 34, for example. To avoid this, relay control unit 313 turns on SSR1 as soon as possible to allow the back electromotive voltage in motor 16 to be recovered via freewheeling diodes D of switching elements U$^+$, V$^+$, W$^+$ in inverter 32, the channel portion of SSR1, and parasitic diode D2 of SSR2 to regeneratively charge in-vehicle battery B. This reduces the probability of damaging predriver 34.

Even when SSR1 is turned on by execution of step S1, motor relays 36 are maintained off until time t5. When rotor 16R is rotated by an external force, a back electromotive voltage is generated in each of the phase coils of first coil set 161. For example, the back electromotive voltage in U-phase coil U1 is positive. The back electromotive voltage in V-phase coil V1 is negative. The back electromotive voltage in W-phase coil W1 is negative. However, the current caused by the back electromotive voltage to flow from the ground to neutral point N1 via parasitic diode D and V-phase coil V1 is interrupted by parasitic diode Dv. In addition, the current caused by the back electromotive voltage to flow from the ground to neutral point N1 via parasitic diode D and W-phase coil W1 is interrupted by parasitic diode Dw. Thus, parasitic diodes Du, Dv, Dw of motor relays 36 prevent motor 16 from working substantially as a generator.

Rotor 16R may be rotated by an external force before motor 16 is energized via inverter 32 in situations such as when ignition switch IGN is turned on while vehicle 100 is lifted up and steering wheel 11 is rotating in a repair shop or the like.

In step S2, relay control unit 313 determines whether or not a predetermined time T1 has elapsed since the control for turning on SSR1 is performed. Here, the predetermined time T1 is greater than the interval from time t1 at which the control for turning on SSR1 is performed to time t2 at which SSR1 is actually turned on, and is equal to an estimated time required for the back electromotive force in motor 16 to be sufficiently recovered via SSR1 to regeneratively charge in-vehicle battery B to decrease to a level that will not damage predriver 34. The value of the predetermined time T1 is stored in advance in a read only memory (ROM) or the like. For example, based on whether the voltage between SSR1 and inverter 32 in positive feed line BL1 decreases to be equal to the power supply voltage Vb of in-vehicle battery B, it may be estimated that the back electromotive voltage in motor 16 has been sufficiently recovered to regeneratively charge in-vehicle battery B and has decreased to a level that will not damage predriver 34.

When relay control unit 313 determines that the predetermined time T1 has elapsed since the control for turning on SSR1 is performed (YES) in step S2, the operation proceeds to step S3. On the other hand, when relay control unit 313 determines that the predetermined time T1 has not yet elapsed since the control for turning on SSR1 is performed (NO), step S2 is repeated.

In step S3, relay control unit 313 outputs a control signal for turning on motor relays 36 to third relay driver 373 (performs control for turning on MRs) at time t3 in FIG. 5. As a result, motor relays 36 are turned on at time t5 with a turn-on delay and/or the like.

When motor relays 36 are turned on, a closed circuit through which a current generated by first coil set 161 returns to first coil set 161 is formed between motor 16 and in-vehicle battery B. This closed circuit extends through parasitic diodes D of upper-arm switching elements U$^+$, V$^+$, W$^+$, the channel portion of SSR1, parasitic diode D2 of SSR2, in-vehicle battery B, the ground, and parasitic diodes D of lower-arm switching elements U$^-$, V$^-$, W$^-$. Here, when rotor 16R of motor 16 is rotated by an external force, motor 16 works substantially as a generator. The current generated by motor 16 continuously flows through freewheeling diodes D of switching elements U$^+$, U$^-$, V$^+$, V$^-$, W$^+$, W$^-$ in inverter 32, parasitic diode D2 of SSR2, and parasitic diodes Du, Dv, Dw of motor relays 36. Thus, depending on the forward voltages of freewheeling diodes D, parasitic diode D2, and parasitic diodes Du, Dv, Dw, excessive heat may be generated and may damage switching elements U$^+$, U$^-$, V$^+$, V$^-$, W$^+$, W$^-$, SSR2, and/or motor relays 36. Accordingly, to reduce the duration for which motor 16 works substantially as a generator, time t5 at which motor relays 36 are turned on is set to be the following time point after time t2 at which SSR1 is turned on. Specifically, time t5 is set to be equal to or close as possible to the time point (time $t_{pwm}$ in FIG. 5) at which energization to first coil set 161 is started in response to the motor control signals output from predriver control unit 312.

In step S4, relay control unit 313 outputs a control signal for turning on SSR2 to second relay driver 372 (performs control for turning on SSR2) at time t4 in FIG. 5. As a result, SSR2 is turned on at time t6 with a turn-on delay and/or the like. In response, the power supply voltage Vb of in-vehicle battery B is applied to inverter 32 (that is, to the drain electrodes of switching elements U$^+$, V$^+$, W$^+$).

Hereinafter, time t4 at which relay control unit 313 outputs the control signal for turning on SSR2 will be described. When ignition switch IGN is turned on and power supply from power supply circuit 33b to processor 31 is started, abnormality diagnostic unit 311 in processor 31 starts performing the abnormality diagnostic function of diagnosing whether or not an abnormality has occurred in the first energization system. If it is assumed that SSR2 is turned on while the upper-arm switching element ($U^+$, for example) and the lower-arm switching element ($U^-$, for example) of the same phase have a short circuit failure, an excessive current may flow from in-vehicle battery B to the ground via the first energization system. Also, if it is assumed that SSR2 is turned on while a short-to-ground has occurred between SSR2 and inverter 32 in positive feed line BL1, an excessive current may flow from in-vehicle battery B to the ground via the first energization system. To avoid these, time t4 at which relay control unit 313 outputs the control signal for turning on SSR2 is set to a time point after the first round of diagnosis is completed by abnormality diagnostic unit 311. At time t4, relay control unit 313 determines whether to turn on SSR2 in accordance with the diagnosis made by abnormality diagnostic unit 311. In this way, an excessive current is prevented or limited from flowing from in-vehicle battery B to the ground via the first energization system even when an abnormality has occurred in the first energization system.

After relay control unit 313 turns on SSR1, motor relays 36, and SSR2 in steps S1 to S4, predriver control unit 312 outputs the motor control signals to predriver 34 to control the energization to first coil set 161 of motor 16. Examples of the motor control signals are a U-phase PWM signal as a U-phase motor control signal, a V-phase PWM signal as a V-phase motor control signal, and a W-phase PWM signal as a W-phase motor control signal.

In step S5, relay control unit 313 determines whether or not a value of an abnormality diagnostic flag F indicates the occurrence of an abnormality. Abnormality diagnostic flag F is a status flag indicating the current state of the first energization system and stored as a result of diagnosis performed by abnormality diagnostic unit 311 in processor 31 by executing the abnormality diagnostic function at a predetermined timing. Abnormality diagnostic flag F is stored in a writable memory such as a random access memory (RAM). For example, when diagnosing that an abnormality has occurred in the first energization system, abnormality diagnostic unit 311 sets the value of abnormality diagnostic flag F to 1. On the other hand, when diagnosing that the first energization system operates normally, abnormality diagnostic unit 311 sets the value of abnormality diagnostic flag F to 0. When relay control unit 313 determines that abnormality diagnostic flag F is set to a value indicating the occurrence of an abnormality (1, for example) (YES), the operation proceeds to step S6. On the other hand, when relay control unit 313 determines that abnormality diagnostic flag F is set to a value indicating normal operation (0, for example) (NO), the operation proceeds to step S10.

When it is determined in step S5 that abnormality diagnostic flag F is set to the value indicating the occurrence of an abnormality, predriver control unit 312 stops outputting the motor control signals (U-phase PWM signal, V-phase PWM signal, and W-phase PWM signal, for example) to predriver 34. As a result, switching elements $U^+$, $U^-$, $V^+$, $V^-$, $W^+$, $W^-$ in inverter 32 are turned off. The same applies to the case in which it is determined that ignition switch IGN is turned off in the subsequent step which will be described later.

In step S6, relay control unit 313 outputs a control signal (turn-off command) for turning off SSR2 to second relay driver 372 (performs control for turning off SSR2) at time t7 in FIG. 5. As a result, SSR2 is turned off at time t9 with a turn-off delay and/or the like. Turning off SSR2 first at time t9 allows stopping the energization from the first energization system that is diagnosed as being abnormal by abnormality diagnostic unit 311 as soon as possible and preventing or limiting an excessive current from flowing from in-vehicle battery B to the ground via inverter 32.

The excessive current flow may occur in situations caused when there is a long interval from when it is determined in step S5 that abnormality diagnostic flag F is set to the value indicating the occurrence of an abnormality to when the output of the motor control signals is stopped. For example, the excessive current flow may be caused by an arm short circuit resulting from an event in which one ($U^+$, for example) of the switching elements of one phase arm has a short circuit failure and the other switching element ($U^-$, for example) is turned on by the PWM signal. Also, the excessive current flow may occur when a short-to-ground occurs in any energization line between a certain one-phase coil (U-phase coil U1, for example) and the arm of the same phase in inverter 32 (U-phase arm, for example), and the upper-arm switching element of this phase involving the short-to-ground is turned on by the PWM signal.

In step S7, relay control unit 313 outputs a control signal (turn-off command) for turning off motor relays 36 to third relay driver 373 (performs control for turning off MRs) at time t8 in FIG. 5. As a result, motor relays 36 are turned off at time t10 with a turn-off delay and/or the like.

When motor relays 36 are turned on, a closed circuit as described above is formed between motor 16 and in-vehicle battery B. Accordingly, when rotor 16R of motor 16 is rotated by an external force, motor 16 works substantially as a generator. The current generated by motor 16 continuously flows through freewheeling diodes D of switching elements $U^+$, $U^-$, $V^+$, $V^-$, $W^+$, $W^-$ in inverter 32, parasitic diode D2 of SSR2, and parasitic diodes Du, Dv, Dw of motor relays 36. Thus, depending on the forward voltages of freewheeling diodes D, parasitic diode D2, and parasitic diodes Du, Dv, Dw, excessive heat may be generated and may damage switching elements $U^+$, $U^-$, $V^+$, $V^-$, $W^+$, $W^-$, SSR2, and/or motor relays 36. To avoid this, motor relays 36 are turned off prior to SSR1 to reduce the duration for which motor 16 works substantially as a generator.

For a while after time t10, motor relays 36 are turned off, but SSR1 is not yet turned off. Thus, even when rotor 16R is rotated by an external force, the back electromotive voltage generated in motor 16 is recovered via freewheeling diodes D of switching elements $U^+$, $V^+$, $W^+$, the channel portion of SSR1, and parasitic diode D2 of SSR2 to regeneratively charge in-vehicle battery B. This reduces the probability of damaging predriver 34.

In addition, after time t10, even if rotor 16R is rotated by an external force while motor relays 36 are turned off, parasitic diodes Du, Dv, Dw of motor relays 36 prevent motor 16 from working substantially as a generator as with before time t5 at which motor relays 36 are turned on.

In step S8, relay control unit 313 determines whether or not a predetermined time T2 has elapsed since the control for turning off SSR2 is performed. Here, the predetermined time T2 is greater than the interval from time t7 at which the control for turning off SSR2 is performed to time t9 at which SSR2 is actually turned off. In addition, the predetermined time T2 is equal to the interval from time t7 at which the control for turning off SSR2 is performed to time t11 at which it is estimated that the back electromotive force in motor 16 decreases to a level that will not damage predriver 34. The value of the predetermined time T2 is stored in advance in the read only memory (ROM). For example, based on whether the voltage between SSR1 and inverter 32 in positive feed line BL1 decreases to be equal to the power supply voltage Vb of in-vehicle battery B, it may be estimated that the back electromotive force in motor 16 has decreased to a level that will not damage predriver 34.

However, it is expected that when abnormality diagnostic flag F has the value indicating the occurrence of an abnormality, a steering assist force is generated by causing second controller 40 to supply power to second coil set 162 while interrupting power that has been supplied to first coil set 161 via first controller 30. This means that rotor 16R is continuously rotated. In this case as well, the back electromotive voltage generated in motor 16 needs to be recovered via the channel portion of SSR1 to regeneratively charge in-vehicle battery B. Accordingly, if step S8 is executed while abnormality diagnostic flag F has the value indicating the occurrence of an abnormality (1, for example), it may be determined whether or not a predetermined time has elapsed since ignition switch IGN is turned off.

When relay control unit 313 determines that the predetermined time T2 has elapsed (YES) in step S8, the operation proceeds to step S9. On the other hand, when relay control unit 313 determines that the predetermined time T2 has not yet elapsed (NO), step S8 is repeated.

In step S9, relay control unit 313 outputs a control signal (turn-off command) for turning off SSR1 to first relay driver 371 (performs control for turning off SSR1) at time t11 in FIG. 5. As a result, SSR1 is turned off at time t12 with a turn-off delay and/or the like.

In step S10, relay control unit 313 determines whether or not ignition switch IGN is turned off. If relay control unit 313 determines that ignition switch IGN is turned off (YES), the operation proceeds to step S6. Then, until the predetermined time Toff has elapsed since ignition switch IGN is turned off, relay control unit 313 maintains the on state of self cutout relay 33d so as to maintain the power supply from power supply circuit 33b to processor 31 and predriver 34. Here, the predetermined time Toff is a time sufficient to execute steps S6 to S9. On the other hand, when relay control unit 313 determines that ignition switch IGN is not turned off (NO), the operation returns to step S5. The timing chart for processing after it is determined that ignition switch IGN is turned off is not shown in the drawings since it is substantially the same as that for processing after the occurrence of an abnormality in FIG. 5.

In motor system 1 according to the first embodiment, the power supply from in-vehicle battery B to inverter 32 is interrupted while SSR1 is turned on and SSR2 is turned off. This aims to recover a current caused by a back electromotive voltage, which may be generated in motor 16 by the rotation of rotor 16R caused by an external force, to regeneratively charge in-vehicle battery B. Furthermore, motor relays 36 are turned off before SSR1 is turned off. This interrupts a closed circuit formed between motor 16 and in-vehicle battery B and reduces the duration for which motor 16 works substantially as a generator. As a result, the current generated by motor 16 does not continuously flow through parasitic diode D2 of SSR2 and parasitic diodes D of switching elements $U^+$, $U^-$, $V^+$, $V^-$, $W^+$, $W^-$ in inverter 32. Accordingly, the durability of SSR1 and the semiconductor switching elements in inverter 32 is less likely to be affected, and thus, motor system 1 provides an improved durability.

Furthermore, turning off motor relays 36 to interrupt the closed circuit formed between motor 16 and in-vehicle battery B also disables an electric brake which will limit the rotation of rotor 16R. This mitigates reduction in a steering assist force and thus, mitigates reduction in driving stability when an abnormality occurs in the first energization system and the steering assist force is generated by supplying power to second coil set 162 while interrupting power supply to first coil set 161.

Furthermore, even after motor relays 36 are turned off, SSR1 is maintained on until the predetermined time has elapsed since the control for turning off SSR2 is performed or when ignition switch IGN is turned off. Thus, the back electromotive voltage generated in motor 16 is recovered via the channel portion of SSR1 and parasitic diode D2 of SSR2 to regeneratively charge in-vehicle battery B. This reduces the probability that the back electromotive voltage generated in motor 16 may damage predriver 34.

Second Embodiment

Next, a motor system according to a second embodiment of the present invention will be described by focusing solely on differences from the motor system according to the first embodiment. The same reference numerals are given to the same components as those in the first embodiment, and the description thereof will be omitted or simplified. The same applies to the embodiments below.

Figure 6:
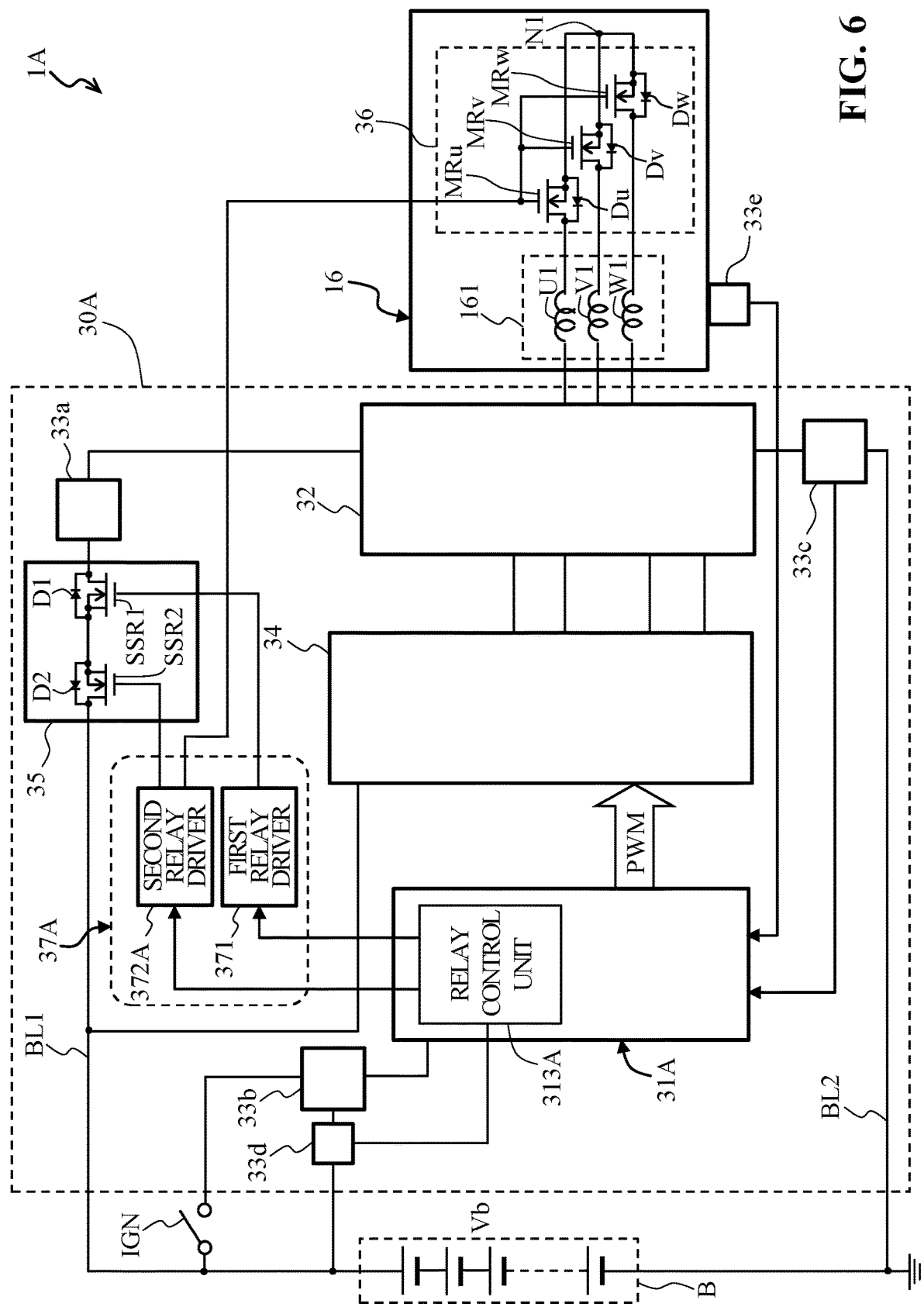
FIG. 6 is a circuit diagram of a first energization system in a motor system according to a second embodiment.

FIG. 6 illustrates an example of the motor system according to the second embodiment. As similar to motor system 1 according to the first embodiment, the first energization system includes first coil set 161 and a first controller 30A in a motor system 1A according to the second embodiment. First controller 30A includes a relay driver 37A having first relay driver 371 configured to drive SSR1 of power supply relay 35, and a second relay driver 372A configured to drive SSR2 of power supply relay 35 and motor relays 36.

Using a single relay driver commonly for driving SSR2 and motor relays 36 are effective in a configuration in which even if control for turning on/off SSR2 and control for turning on/off motor relays 36 are simultaneously performed, SSR2 and motor relays 36 are actually turned on/off at time points as illustrated in FIG. 5.

Figure 7A:
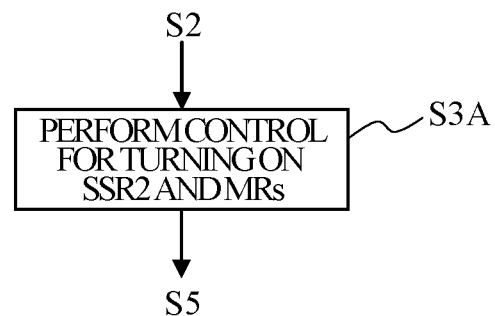
FIGS. 7A and 7B illustrate a part of a flowchart illustrating relay control processing performed in the motor system.
Figure 7B:
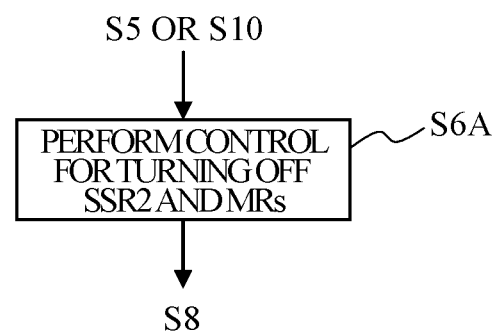

FIGS. 7A and 7B illustrate differences from the relay control processing according to the first embodiment of FIG. 4. When a relay control unit 313A of a processor 31A determines in step S2 that the predetermined time T1 has elapsed since the control for turning on SSR1 is performed, the operation proceeds to step S3A of FIG. 7A. Specifically, relay control unit 313A outputs the control signal for turning on SSR2 and motor relays 36 to second relay driver 372A (performs control for turning on SSR2 and MRs) in step S3A, and the operation proceeds to step S5. In addition, when relay control unit 313A determines in step S5 that abnormality diagnostic flag F is set to the value indicating the occurrence of an abnormality or when relay control unit 313A determines in step S10 that ignition switch IGN is turned off, the operation proceeds to step S6A of FIG. 7B. Specifically, relay control unit 313A outputs the control signal for turning off SSR2 and motor relays 36 to second relay driver 372A (performs control for turning off SSR2 and MRs) in step S6A, and the operation proceeds to step S8.

In motor system 1A according to the second embodiment described above, second relay driver 372A is used commonly for driving SSR2 of power supply relay 35 and motor relays 36. Thus, motor system 1A not only provides the same effects as those in the first embodiment, but also allows more simplified control processing in which relay control unit 313A outputs a reduced number of control signals. Furthermore, in motor system 1A, first controller 30A requires a smaller board footprint.

Third Embodiment

Figure 8:
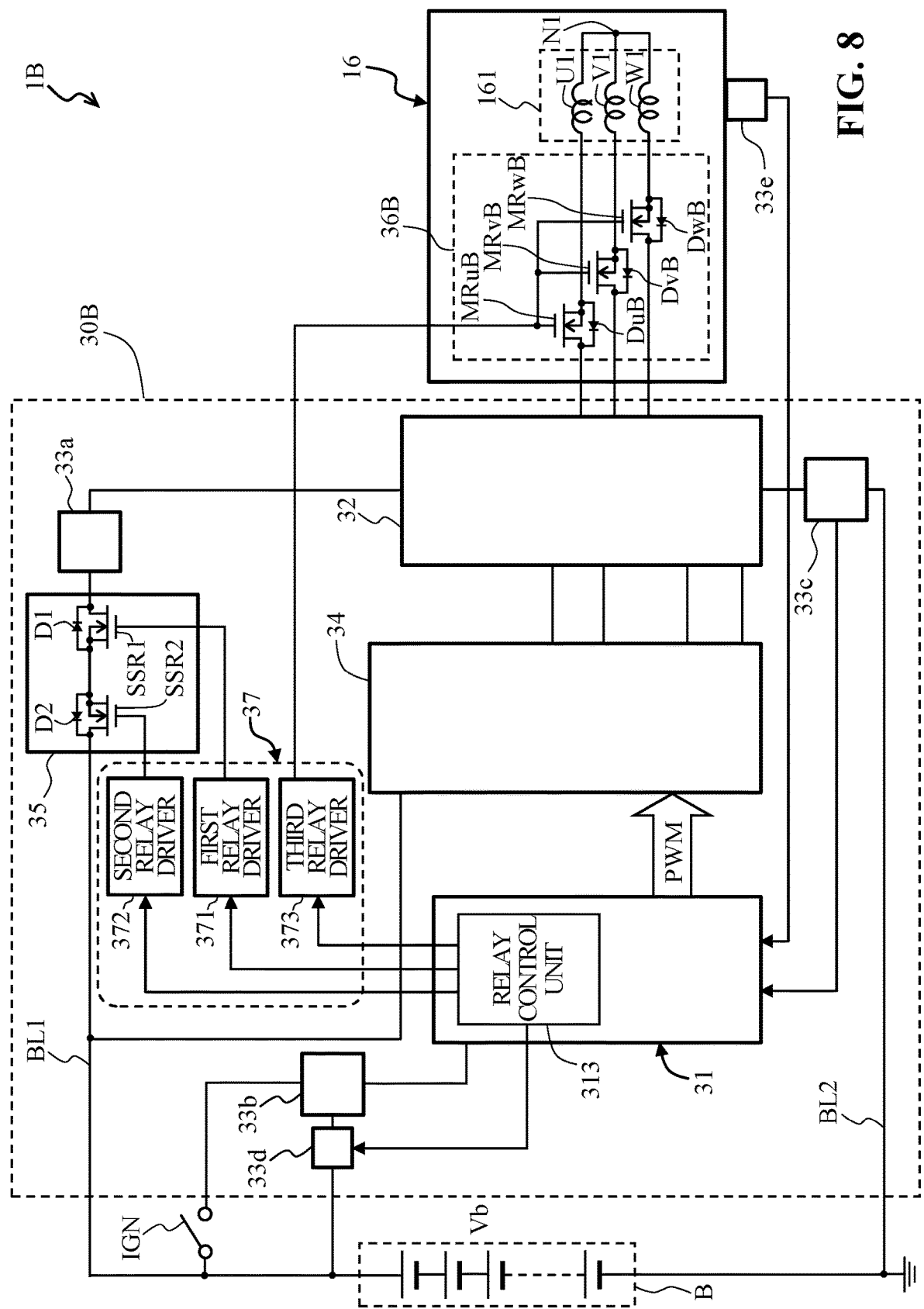
FIG. 8 is a circuit diagram of a first energization system in a motor system according to a third embodiment.

Next, a motor system according to a third embodiment of the present invention will be described by focusing solely on differences from the motor system according to the first embodiment. FIG. 8 illustrates an example of the motor system according to the third embodiment. As similar to motor system 1 according to the first embodiment, the first energization system includes first coil set 161 and a first controller 30B in a motor system 1B according to the third embodiment.

However, unlike motor relays 36 of the first embodiment, motor relays 36B are provided between first coil set 161 and inverter 32. Motor relays 36B include three relays, which are a U-phase motor relay MRuB, a V-phase motor relay MRvB, and a W-phase motor relay MRwB. U-phase motor relay MRuB is provided between U-phase coil U1 and inverter 32. V-phase motor relay MRvB is provided between V-phase coil V1 and inverter 32. W-phase motor relay MRwB is provided between W-phase coil W1 and inverter 32.

When rotor 16R is rotated by an external force while motor relays 36B are turned off, a back electromotive voltage is generated in each of the phase coils of first coil set 161. For example, the back electromotive voltage in U-phase coil U1 is positive. The back electromotive voltage in V-phase coil V1 is negative. The back electromotive voltage in W-phase coil W1 is negative. However, the current caused by the back electromotive voltage to flow from the ground to neutral point N1 via parasitic diode D and V-phase coil V1 is interrupted by parasitic diode DvB. In addition, the current caused by the back electromotive voltage to flow from the ground to neutral point N1 via parasitic diode D and W-phase coil W1 is interrupted by parasitic diode DwB.

Thus, as in the first embodiment, parasitic diodes DuB, DvB, DwB of motor relays 36B prevent motor 16 from working substantially as a generator while motor relays 36B are turned off in motor system 1B according to the third embodiment.

In motor systems 1, 1A, and 1B according to the first to third embodiments, predriver control unit 312 stops outputting the motor control signals (U-phase PWM signal, V-phase PWM signal, and W-phase PWM signal) to predriver 34 when a predetermined condition is satisfied. Specifically, the predetermined condition is satisfied when it is determined in step S5 that abnormality diagnostic flag F is set to the value indicating the occurrence of an abnormality, or when it is determined in step S10 that ignition switch IGN is turned off. However, predriver control unit 312 may perform an alternative operation from when step S5 or S10 is performed to when motor relays 36 are turned off. Specifically, as an alternative, predriver control unit 312 may output the motor control signals to predriver 34 so that a back electromotive force generated in motor 16 does not exceed power supplied from in-vehicle battery B to first coil set 161 of motor 16. This prevents or limits a current caused by the back electromotive force in motor 16 from flowing into predriver 34.

For example, based on the output signal from amplifier OP of current sensing circuit 33c, predriver control unit 312 may output the motor control signals to predriver 34 so that the current supplied from in-vehicle battery B to first coil set 161 of motor 16 is 0 amperes.

In the above description for the first to third embodiments, when the control for turning on motor relays 36 is performed at time t3 in step S3, motor relays 36 are actually turned on at time t5. When the control for turning on SSR2 is performed at time t4 in step S4, SSR2 is actually turned on at time t6. However, these are merely illustrative examples, and the embodiments may be modified in consideration of: the effects that may be caused by a back electromotive voltage during the duration for which motor 16 may work substantially as a generator after motor relays 36 are turned on; and what time the first round of diagnosis is completed by abnormality diagnostic unit 311. Specifically, motor relays 36 and SSR2 may be turned on simultaneously or in the order opposite to the above. Still alternatively, the embodiments may be modified in consideration of factors such as what time motor relays 36 and SSR2 are actually turned on and how long are the turn-on delays for the semiconductor switching elements of motor relays 36 and SSR2. Specifically, the control for turning on motor relays 36 and the control for turning on SSR2 may performed simultaneously or in the order opposite to the above.

In the above description for the first to third embodiments, when the control for turning off SSR2 is performed at time t7 in step S6, SSR2 is actually turned off at time t9. When the control for turning off motor relays 36 is performed at time t8 in step S7, motor relays 36 is actually turned off at time t10. However, these are merely illustrative examples, and the embodiments may be modified in consideration of: the effects that may be caused by a back electromotive voltage during the duration for which motor 16 may work substantially as a generator while motor relays 36 are turned on; and the effects of a delay in stopping the output of the motor control signals. Specifically, motor relays 36 and SSR2 may be turned off simultaneously or in the order opposite to the above. Still alternatively, the embodiments may be modified in consideration of factors such as what time motor relays 36 and SSR2 are actually turned off and how long are the turn-off delays for the semiconductor switching elements of motor relays 36 and SSR2. Specifically, the control for turning off motor relays 36 and the control for turning off SSR2 may performed simultaneously or in the order opposite to the above.

Additionally or alternatively, the embodiments may further be modified when abnormality diagnostic unit 311 is configured to identify which of inverter 32, predriver 34, and motor 16 (first coil set 161) in the first energization system involves an abnormality. Specifically, depending on where an abnormality has occurred, abnormality diagnostic unit 311 may determine when to turn on/off SSR1, SSR2, and motor relays 36.

For example, when abnormality diagnostic unit 311 diagnoses that an abnormality has occurred in inverter 32, motor relays 36 are turned off in step S7 and then SSR1 is turned off in step S9, as described above. This interrupts a shoot-through current that may otherwise flow from in-vehicle battery B to the ground through upper-arm switching element $U^+$, $V^+$, $W^+$ in inverter 32, first coil set 161, and lower-arm switching elements $U^-$, $V^-$, $W^-$ when an abnormality occurs in inverter 32, thereby providing improved safety. On the other hand, when abnormality diagnostic unit 311 diagnoses that an abnormality has occurred in components other than inverter 32 in the first energization system, motor relays 36 are turned off prior to SSR1 and SSR2. In a situation where motor relays 36 are reliably turned off, turning off motor relays 36 prior to SSR2 may provide improved safety.

In the first to third embodiments, when to perform the control for turning on motor relays 36 in step S3 is determined depending on whether or not the predetermined time T1 has elapsed after the control for turning on SSR1 is performed (step S2). Alternatively, however, when to perform the control for turning on motor relays 36 may be determined depending on the level of a back electromotive voltage generated in motor 16. A voltage value detected between inverter 32 and SSR2 in positive feed line BL1 may be used as an indication of the back electromotive voltage generated in motor 16. Alternatively, the rotation speed of rotor 16R may be calculated from the output signal of magnetic pole position sensor 33e, and a back electromotive voltage value estimated based on this rotation speed may be used as an indication of the back electromotive voltage generated in motor 16. Similarly, in step S9, when to perform the control for turning off SSR1 may be determined depending on the level of a back electromotive voltage generated in motor 16 instead of depending on whether or not the predetermined time T2 has elapsed in step S8.

In the first to third embodiments, motor systems 1, 1A, 1B to be used in an electric power steering apparatus have been described as each having two energization systems. However, the present invention is not limited to this, and each motor system 1, 1A, 1B may have one or three or more energization systems. Furthermore, the present disclosure does not exclude other embodiments in which motor systems 1, 1A and 1B are used in apparatuses other than electric power steering apparatuses.

REFERENCE SYMBOL LIST

1 Motor system
16 Motor
161 First coil set
31, 31A Processor
311 Abnormality diagnostic unit
312 Predriver control unit
313, 313A Relay control unit
32 Inverter
34 Predriver
36, 36B Motor relay
B In-vehicle battery
D1 First diode
D2 Second diode
Du, Dv, Dw Third diode
N1 Neutral point
SSR1 First solid-state relay
SSR2 Second solid-state relay

The invention claimed is:

1. A motor system comprising:
a motor having a plurality of stator coils;
an inverter configured to control energization to the plurality of stator coils;
a predriver configured to control drive of the inverter;
a first solid-state relay and a second solid-state relay that are disposed between the inverter and a battery for supplying power to the inverter, and that are connected in series in this order in a direction from the inverter to the battery,
the first solid-state relay having a first diode of which a forward direction is from the battery to the inverter,
the second solid-state relay having a second diode of which a forward direction is from the inverter to the battery;
a plurality of motor relays provided one-to-one for the plurality of stator coils and configured to interrupt energization to the plurality of stator coils; and
a processor including:
a predriver control unit configured to control drive of the predriver; and
a relay control unit configured to control the first solid-state relay, the second solid-state relay, and the motor relays;
wherein when power supply from the battery to the inverter is interrupted, the relay control unit turns off the first solid-state relay after turning off the motor relays.

2. The motor system according to claim 1, wherein when power supply from the battery to the inverter is interrupted,
the relay control unit sequentially turns off the second solid-state relay, the motor relays, and the first solid-state relay in this order, or
the relay control unit turns off the second solid-state relay and the motor relays simultaneously and then turns off the first solid-state relay.

3. The motor system according to claim 2, wherein when power supply from the battery to the inverter is interrupted, the relay control unit outputs turn-off commands to the second solid-state relay and the motor relays simultaneously.

4. The motor system according to claim 2, wherein when power supply from the battery to the inverter is started, the relay control unit turns on the motor relays after turning on the first solid-state relay.

5. The motor system according to claim 4, wherein when power supply from the battery to the inverter is started,
the relay control unit sequentially turns on the first solid-state relay, the motor relays, and the second solid-state relay in this order, or
the relay control unit turns on the first solid-state relay and then turns on the motor relays and the second solid-state relay.

6. The motor system according to claim 1, wherein
the plurality of stator coils are star-connected to each other at a neutral point,
each of the plurality of motor relays is a semiconductor switching element,
each of the plurality of motor relays has a third diode, and
each of the third diodes is disposed with an anode thereof located closer to the neutral point.

7. The motor system according to claim 1, wherein
the processor includes an abnormality diagnostic unit configured to diagnose whether or not an abnormality has occurred in the motor, the inverter, or the predriver, and
when the abnormality diagnostic unit diagnoses that an abnormality has occurred in the motor, the inverter, or the predriver, the relay control unit turns off the first solid-state relay after turning off the motor relays.

8. The motor system according to claim 7, when the abnormality diagnostic unit diagnoses that an abnormality has occurred in the inverter, the relay control unit turns off the first solid-state relay after turning off the motor relays.

9. The motor system according to claim 8, when the abnormality diagnostic unit diagnoses that an abnormality has occurred in components other than the inverter, the relay control unit turns off the motor relays before turning off the first solid-state relay and the second solid-state relay.

10. The motor system according to claim 1, wherein when power supply from the battery to the inverter is interrupted, the predriver control unit controls drive of the predriver so that a back electromotive force generated in the motor does not exceed a power supplied from the battery to the plurality of stator coils until the relay control unit turns off the motor relays.

11. The motor system according to claim 10, wherein when power supply from the battery to the inverter is interrupted, the predriver control unit controls drive of the predriver so that a current flowing through the plurality of stator coils is 0 amperes until the relay control unit turns off the motor relays.

* * * * *